US010133826B2

(12) United States Patent
Mehta et al.

(10) Patent No.: US 10,133,826 B2
(45) Date of Patent: Nov. 20, 2018

(54) UDDI BASED CLASSIFICATION SYSTEM (75) Inventors: Harish Mehta, Walldorf (DE); Thierry Tung, Gaiberg (DE); Alexander Zubev, Pazardzhik (BG); Timm Falter, Kreuzaecker (DE)

(73) Assignee: SAP SE, Walldorf (DE)

(*) Notice: Subject to any disclaimer, the term of this patent is extended or adjusted under 35 U.S.C. 154(b) by 2163 days.

(21) Appl. No.: 11/843,576

(22) Filed: Aug. 22, 2007

(65) Prior Publication Data
US 2009/0055345 A1    Feb. 26, 2009

(51) Int. Cl.
*G06F 17/30*    (2006.01)
(52) U.S. Cl.
CPC .. *G06F 17/30943* (2013.01); *G06F 17/30997* (2013.01)
(58) Field of Classification Search
CPC ......... G06F 17/30592; G06F 17/30601; G06F 17/30943; G06F 17/30997; G06F 17/30598; G06Q 10/00; G06Q 10/06; G06Q 30/02
USPC .................................................. 707/603, 737
See application file for complete search history.

(56) References Cited

U.S. PATENT DOCUMENTS

| | | | |
|---|---|---|---|
| 6,976,027 B2* | 12/2005 | Cutlip ........................... 707/101 |
| 6,980,984 B1* | 12/2005 | Huffman et al. ................ 707/3 |
| 7,127,455 B2* | 10/2006 | Carson et al. ................... 707/3 |
| 7,177,862 B2* | 2/2007 | Zhang et al. .................... 707/4 |
| 7,206,778 B2* | 4/2007 | Bode et al. ...................... 707/5 |
| 7,249,100 B2* | 7/2007 | Murto et al. ................... 705/50 |
| 7,428,582 B2* | 9/2008 | Bean et al. .................... 709/218 |
| 7,447,677 B2* | 11/2008 | Milligan et al. |
| 7,962,470 B2* | 6/2011 | Degenkolb et al. .......... 707/709 |
| 2002/0133392 A1* | 9/2002 | Angel et al. ................... 705/10 |
| 2003/0018626 A1* | 1/2003 | Kay et al. ........................ 707/3 |
| 2003/0084066 A1* | 5/2003 | Waterman et al. ........ 707/104.1 |
| 2003/0115187 A1* | 6/2003 | Bode et al. ....................... 707/3 |
| 2003/0115191 A1* | 6/2003 | Copperman et al. ............. 707/3 |
| 2004/0010598 A1* | 1/2004 | Bales et al. ................... 709/228 |
| 2004/0039738 A1* | 2/2004 | Cutlip .............................. 707/5 |
| 2004/0064554 A1* | 4/2004 | Kuno et al. ................... 709/225 |
| 2004/0093326 A1* | 5/2004 | Carson et al. .................... 707/3 |
| 2005/0005232 A1* | 1/2005 | Gosby .......................... 715/500 |
| 2005/0038867 A1* | 2/2005 | Henderson et al. .......... 709/217 |
| 2005/0091174 A1* | 4/2005 | Akkiraju et al. ............... 705/75 |
| 2005/0198206 A1* | 9/2005 | Miller et al. .................. 709/219 |
| 2006/0026125 A1* | 2/2006 | Breeds ............................. 707/2 |

(Continued)

OTHER PUBLICATIONS

Ehnebuske, D. and C. Kurt "UDDI Core tModels: Taxonomy and Identifier Systems", v. 1.03, downloaded from uddi.org, Aug. 23, 2001.*

(Continued)

*Primary Examiner* — James Trujillo
*Assistant Examiner* — Jessica N Le
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for providing a classification service. The method may receive a request to access a UDDI registry. The classification service may access metadata representing a classification system for the data stored in the UDDI registry. The classification service may provide the data stored in the UDDI registry in a format based on the access metadata. Related apparatus, systems, methods, and articles are also described.

21 Claims, 10 Drawing Sheets

(56) References Cited

U.S. PATENT DOCUMENTS

| | | | |
|---|---|---|---|
| 2006/0047619 A1* | 3/2006 | Brealey et al. | 707/1 |
| 2006/0212461 A1* | 9/2006 | Meysman | 707/100 |
| 2006/0235986 A1* | 10/2006 | Kim | 709/229 |
| 2007/0168479 A1* | 7/2007 | Bean et al. | 709/223 |
| 2007/0226262 A1* | 9/2007 | Akkiraju et al. | 707/104.1 |
| 2007/0250487 A1* | 10/2007 | Reuther | 707/3 |
| 2007/0282879 A1* | 12/2007 | Degenkolb et al. | 707/101 |
| 2008/0040510 A1* | 2/2008 | Warner et al. | 709/246 |
| 2008/0271047 A1* | 10/2008 | Rafnsson | 719/311 |
| 2010/0100525 A1* | 4/2010 | Huang | 707/609 |

OTHER PUBLICATIONS

Trivedi, R. "The Role of Taxonomies in UDDI: tModels Demystified", Developer Magazine, downloaded from www.developer.com, Jun. 18, 2002.*

IBM "WebSphere® Application Server V5.1 UDDI Utility Tools", slide show presentation w/notes, downloaded from www.ibm.com, Nov. 1, 2003.*

Clement, L., A. Hately and C. von Riegen "UDDI Core v2 and v2/v3 Utility Classification Schemes, Taxonomies, Identifier Systems, and Relationships", downloaded from uddi.org, Aug. 15, 2004.*

Yu, J. and G. Zhou "Web Service Discovery and Dynamic Invocation Based on UDDI/OWL-S", Proceedings of the Workshop on Business Processes and Services, LNCS vol. 3812, 2006, pp. 47-55.*

Mintchev, A. "Interoperability Among Service Registry Implementations: Is UDDI Standard Enough?", Proceedings of the IEEE International Conference on Web Services, 2008, pp. 724-731.*

Liu et al., "Service Registration and Discovery in a Domain-Oriented UDDI Registry", Sep. 2005, IEEE Computer Society, pp. 276-282.*

Liu et al., "A UDDI-based Two-Level Information Management System for Equipment Grid", Jun. 2006, IEEE Computer Society, vol. 01, pp. 577-582.*

Shil et al., "Additional Functionalities to SOAP, WSDL, and UDDI for a Better Web Services' Administration", 2006, IEEE Computer Society, vol. 1, pp. 572-577.*

* cited by examiner

Publication of Service Model

UDDI V3

*tModel name=[portType local name]*
*overviewURL = [wsdl location]*
*overviewURL = [documentation location]*

*categoryBag*
  *type = portType*
  *namespace = [namespace]*
  types = er service
  types = er service modeled

*Keyed reference group*
  deployment unit = [SAP DU]
  process component = [SAP PC]
  business object = [SAP BO]

FIG. 4

Publication of Service

UDDI V3 tModel name=[portType local name]
overviewURL = [wsdl location]
overviewURL = [documentation location]

categoryBag
  type = portType
  namespace = [namespace]
  types = er service
  types = er service implemented
  physical system  reference = [physical system tmodel]

Keyed reference group
  deployment unit = [SAP DU]
  process component = [SAP PC]
  business object = [SAP BO]

identifierBag
  ide internal name = [internal name]

FIG. 5

Publication of Service Endpoint tModel name=[binding local name]
overviewURL = [wsdl location]
- categoryBag
  - type = binding
  - namespace = [namespace]
  - portType = [portType tModel]
  - protocol = SOAP
  - transport = HTTP
  - types = ~~er~~ service businessService name=[humanreadable name]
- categoryBag
  - type = service
  - namespace = [namespace]
  - local name = [service local name]
  - types = ~~er~~ service
- bindingTemplate
  - accessPoint = [access point]
  - portType = [portType tModel]
  - binding = [binding tModel]
    - local name = [port local name]
  - types = ~~er~~ service

FIG. 6

Publication of Physical System

UDDI V3 tModel name=[physical system name e.g B7T on is4005]

categoryBag
   systemname = [e.g. B7T]
   hostname = [e.g. is4005]
   systemtype = [e.g. 1]
  business system partition (ABAPClient) = [e.g 100]
  ...

identifierBag
  physical system id = [SAP SLD system ID]

FIG. 7

Tmodel for classification system.

tModel name=[value set name]
description=[description]

categoryBag
 types = categorization
 type = er classification system

Tmodel for group classification system.

tModel name=[categorization group name]
description=[description]

categoryBag
 types = categorizationGroup
 type = er classification system
 group member reference = [tm key 1]
 ...
 group member reference = [tm key N]

Publication of a Classification System

UDDI BASED CLASSIFICATION SYSTEM

FIELD

This present disclosure generally relates to managing and providing a classification service.

BACKGROUND

UDDI (short for Universal Description, Discovery, and Integration (UDDI)) is a web-based distributed directory to enable entities, such as businesses and web services, to be listed on the Internet, discovered, and then accessed. UDDI uses a registry based on the eXtensible Markup Language (XML). The XML-based UDDI registry enables entities to be listed in the UDDI registry, which may be accessed through a public Internet or through a private intranet. When registered, the registration includes three components which are as follows: a so-called "white pages" registration including addresses, contact information, and known identifiers; a so-called "yellow pages" registration including industrial categorizations based on standard taxonomies (e.g., using standard industrial categorization schemes, industry codes, product codes, business identification codes, and the like) to make it easier to search through the listings; and a so-called "green pages" registration including technical information about services provided or exposed (e.g., discovery information including, interface information, a Uniform Resource Locator (URL), a WSDL (Web Services Description Language) of the service, and the like). Past specifications define many aspects of UDDI. For example, the UDDI Version 3.0.2 Specification describes the web services, data structures, and the behavior of the UDDI registry (see, e.g., OASIS UDDI Version 3.0.2 Specification, dated Oct. 19, 2004).

UDDI may be implemented as a web service accessible using standard protocols, such as Simple Object Access Protocols (SOAP) for messaging and WSDL documents for describing the protocols, bindings, and message formats required to interact with the web services listed in the UDDI registry. A service, such as a Web service is an application or program that makes itself available over the Internet or an intranet, may use standardized messaging, such as XML (eXtensible Markup Language) and SOAPS and may use some type of location mechanism, such as UDDI to locate the service and its Application Program Interface (API).

The UDDI registry may include UDDI data types. UDDI data types refer to one or more of the following data types used by the UDDI registry when storing and accessing the above-noted white, yellow, and green page information, a businessEntity data type for describing a business or other entity for which information is being registered; a businessService data type for describing a set of web services which may contain one or more bindingTemplates; a bindingTemplate data type for information necessary to invoke specific web services which may encompass bindings to one or more protocols, such as HTTP (Hyper Text Transfer Protocol); and a tModel data type which is a technical model representing reusable constructs.

UDDI may thus provide a useful mechanism to enable entities (e.g., web services, businesses, and the like) to register at a UDDI registry one or more of the following, the identity of the entity, the location of the entity, and how to access and interact with the entity. As such, other entities can find and then access the registered entities.

SUMMARY

The subject matter disclosed herein provides methods and apparatus, including computer program products, for providing a classification service. In one aspect there is provided a computer-implemented method. The method may receive a request to access a UDDI registry. The classification service may access metadata representing a classification system for the data stored in the UDDI registry. The classification service may provide the data stored in the UDDI registry in a format based on the accessed metadata.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

In the drawings.

Like labels are used to refer to same or similar items in the drawings.

DETAILED DESCRIPTION

Figure 1:
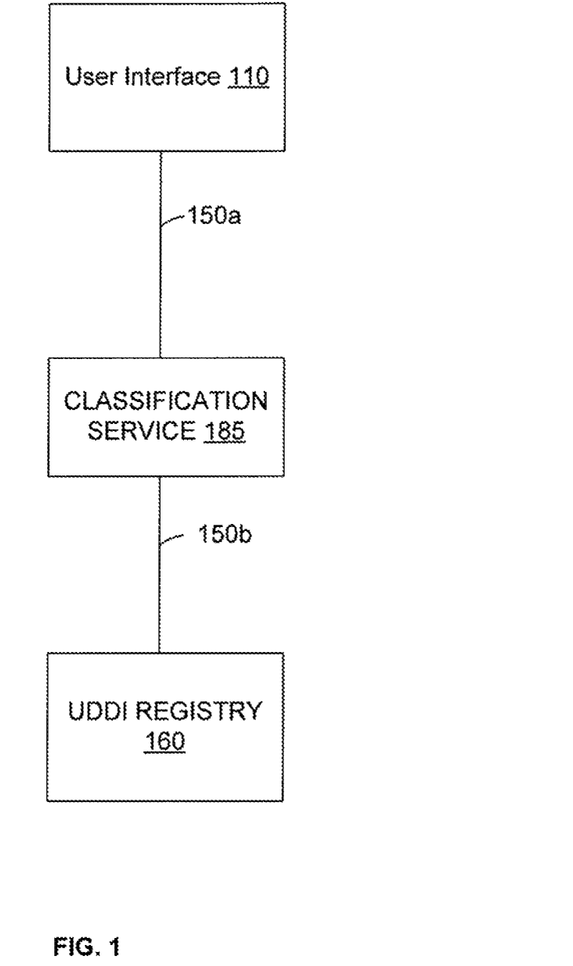
FIG. 1 depicts a system including a classification service.

FIG. 1 depicts an exemplary system 100 including a user interface 110, a classification service 185, and a UDDI registry 160, all of which are coupled by network 150*a-b* (e.g., the Internet, an intranet, or any other communication mechanism).

User interface 110 may be implemented as any type of interface that enables interaction with an application, such as a web service. For example, the user interface 110 may be implemented as a browser or a client application to interface with (and/or access) classification service 185 and UDDI registry 160. Although the following description refers to a web service, other implementations using programs, applications, and services may be used as well.

UDDI registry 160 includes descriptors of web services registered at UDDI registry 160. The descriptors (also referred to as service descriptors) may be in the form of XML and may include information to enable finding a web service and binding to the web service. For example, to search for a web service, user interface 110 searches through XML-based descriptions of web services included in UDDI registry 160. When a web service is found, the UDDI registry includes information (e.g., a WSDL description of the web service) to enable user interface 110 to bind to the web service. The descriptors of the web service include elements, such as white pages information, yellow pages information, green pages information, tModels, as well as other metadata.

Classification service 185 may be implemented as a web service and include one or more APIs. Through one of the APIs, classification service 185 manages classification data and is a source of classification data. The classification data refers to information (e.g., metadata), which may be used to form classification systems from data in UDDI registry 160. For example, key identifiers may be used to identify information in a UDDI registry. The classification data (i.e., metadata) may be used to format (e.g., organize, describe, classify, and the like) data in the UDDI registry. Moreover, the classification data may be used to form classification systems, as described below.

Classification service 185 manages and stores classification data. Classification service 185 enables information stored in UDDI registry 160 to be accessed and classified according to a predefined classification system (e.g., as described below with respect to FIGS. 2 and 3). As such, classification service 185 may enable user interface 110 to view and browse data in UDDI registry 160 based on predefined classification systems, such as a hierarchy format, a flat format, a group format, or in any other format defined by classification service 185. As such, data in UDDI registry 160 may be formatted (e.g., presented, searched, browsed, organized, classified, and the like) based classification systems defined by classification data (i.e., metadata) stored in classification service 185—enabling customized classification schemes for UDDI registry data.

In some implementations, classification service 185 is separate from UDDI registry 160. Moreover, classification service 185 may manage the classification of any data in UDDI registry 160. The classification service 185 may also perform one or more of the following functions; expose APIs to retrieve the list of supported classification systems and their related metadata; expose APIs to retrieve the entire content of a classification system; expose APIs to write content to a classification system; and expose the UDDI V3 standard get_allValidValues API to allow UDDI V3 servers to cache classification system values in order to check validity at UDDI entity save time.

Moreover, in some implementations, classification service 185 may include different types of predetermined classification systems (also referred to as taxonomies), such as a flat format, a hierarchy format, a group format, and the like. A flat classification system is simply a flat list of codes and descriptions. The code values are used directly as the value attribute of keyed reference elements used for UDDI registry data categorization. A hierarchy classification system is a tree-like format in which each node in the tree has a code and, possibly, a description. With the hierarchy formats the code may not (without more information) identify a node in the tree since a node in the tree is identified uniquely by the code together with the path from the root of the tree to that code. In hierarchy classification systems where the codes are not all unique throughout the trees the code value alone cannot be used as the value attribute of keyed reference elements for UDDI registry data categorization. Instead, the path and the code must be used. A group classification system is a way to associate values from flat and/or hierarchy formats.

Figure 2:
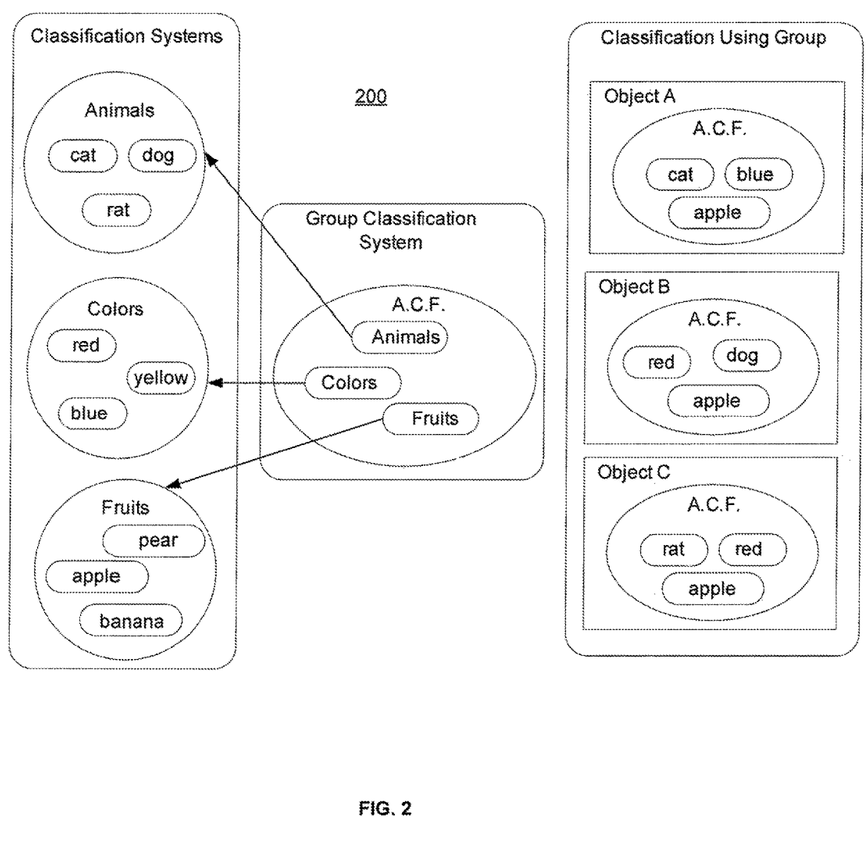
FIG. 2 is a diagram depicting a classification system.

FIG. 2 depicts an example of a group classification 200. The group defines its constituent classification systems, which in this example represents object A, object B, and object C. Each value in a group classification system is thus a set of values. The set contains zero or one value per constituent classification system. Group hierarchies are modeled as keyed reference groups.

Figure 3:
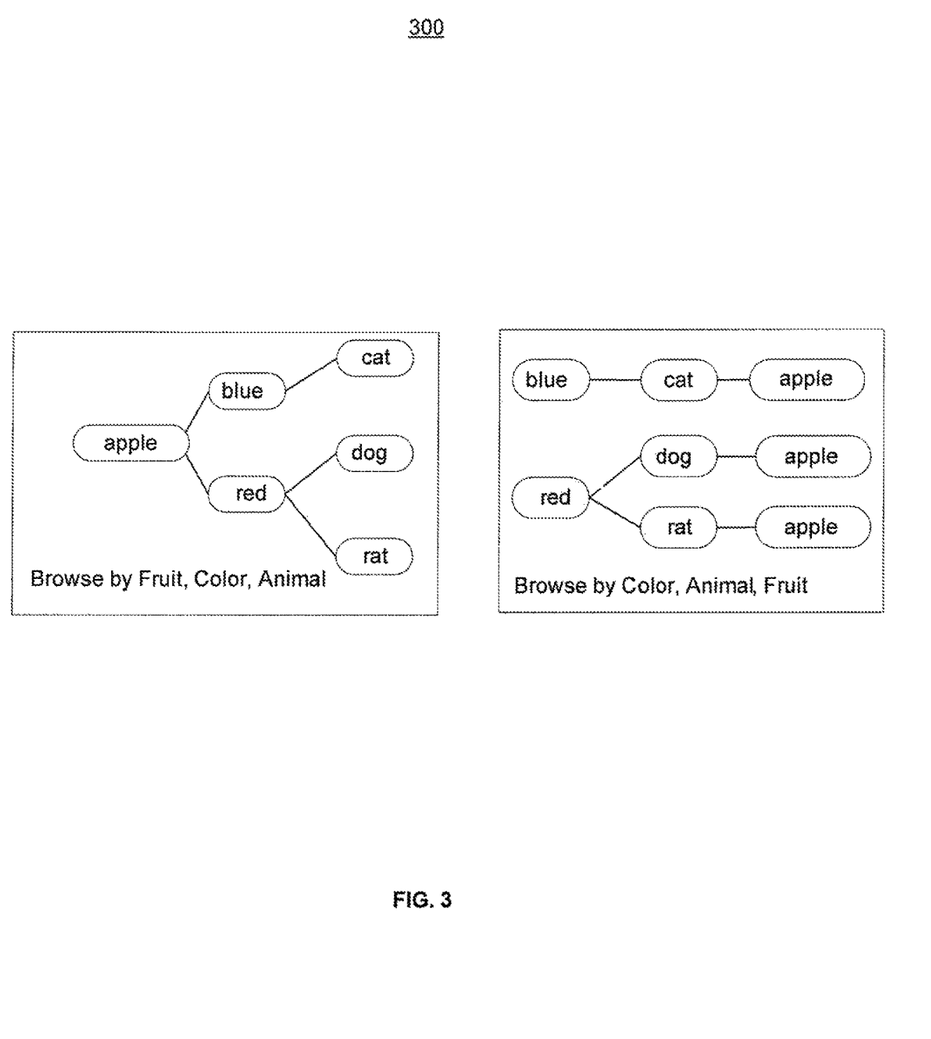
FIG. 3 is a another diagram depicting a classification system.

FIG. 3 depicts an example of a group classification system 300 expressed as a tree including different constituent classification systems forming each level of the tree. The classification service 185 supports the depicted presentation of groups as trees. The caller (e.g., user interface 110) may specify the order of the constituent classification systems.

Referring to FIGS. 2 and 3, classification service 185 may use classification data (e.g., metadata stored in classification service 185) to classify data in the UDDI registry (e.g., cat, dog, rat, red, blue, yellow, pear, apple, and banana). For this UDDI registry data, the classification data may include metadata describing groups (e.g., animals, colors, and fruits). Moreover, the classification data may also describe other classification systems based on these groups. For example, the metadata stored at classification service 185 may describe group formats including animals, colors, and fruits, such as "Object A." The metadata may thus include descriptions (e.g., XML-based descriptions) as well as links to identifiers (e.g., keys) in the UDDI registry. For example, an identifier "1010" may be associated with the UDDI registry data for "dog" and may be associated with metadata to enable classification of "dog" registry data as classification system "Animals."

Classification service 185 may provide a variety of different, predefined classification systems. In some cases, the classification service 185 may include templates (or examples) of predefined classification systems (e.g., possible values, descriptions, and format), which may be augmented dynamically at design time and at runtime. In some implementations, the ability to add values "on the fly" to a classification system via the API of the classification service 185 is an advantage of the subject matter described herein since design time tools may now allow a developer to classify services they have built to dynamically add values to the predefined classification systems without, in some cases, having to perform cumbersome steps (e.g., export/import steps, re-install, re-deploy, and the like). Moreover, the classification service 185 may, in some implementations, allow classification systems to be transported between systems (so-called "landscapes") on-the-fly. For example, when a new value is added to a classification system in a development landscape, the new value would enter the production landscape only when a web service using the new value is deployed in a runtime, production landscape.

In one implementation, the initial content for each predefined classification system is provided as a flat, tab separated text file, which is included as part of the classification service 185. The flat, tab separated text file may be implemented as four columns as follows; column 1 including a code; column 2 including descriptive text, column 3 including parent information; and column 4 including information regarding whether the code of column 1 may be used for classification. Moreover, the first row of the flat, tab separated text file may include the names of the columns (e.g., a string of ASCII text). For example, column 1 may include a code representing a value attribute of a keyed reference. Column 2 may include text for describing the code of column 1. Column 3 may be used to support classification systems formatted as trees by identifying path information (e.g., information identifying one or more nodes associated with the tree hierarchy or a parent node in the hierarchy). In some implementations, a node in the tree hierarchy is a so-called "parent node" having a unique identifier to identify the parent node from other nodes. When the value in column 4 is "no" or "false," this represents that the code of column 1 may not be used to classify data, wherein any other values in column 4 represent that the code of column 1 may be used to classify data.

Through the API of classification service 185, metadata stored at classification system 185 may be used to access information to provide classification systems for registry data stored in UDDI registry 160. Tables 1-4 include parameters used in one or more calls to an API of classification service 185 (e.g., user interface 110 makes a call using SOAP to classification service 185 to access registry data stored at UDDI registry 160). Moreover, these parameters may represent metadata to describe the data in the UDDI registry 160.

TABLE 1

Classification System Metadata
Classification System Metadata (all types of classification systems)

| Name | Type | Descripton |
|---|---|---|
| Id | String | Identifies the classification system. It can be the UDDI V3 tModel Key that represents that Classification System. |
| Name | String | The name of the classification system |
| description | String | Description of the classification system. |
| Type | Int | The type of the classification system. FLAT = 0, HIERARCHY = 1 or GROUP = 2 |
| isPredefined | Boolean | True if this classification system is a one of the Predefined Classification Systems. |
| isReadOnly | Boolean | True if the values of this classification system cannot be modified using the write APIs. |
| isOnlyOnce | Boolean | True if it is semantically wrong to classify the same thing more than once using this classification system. |
| valuesVersion | Long | Version of values of this classification system. This version is changed on each save or delete of values of this system. |

TABLE 2

Classification System Metadata
Classification System Metadata (FLAT and HIERARCHY)

| Name | Type | Description |
|---|---|---|
| mustHaveDescription | Boolean | True if the each value of the classification system must have a description. |
| normalizeCodes | Boolean | If true, the codes of this value set are "normalized" before being processed by the save APIs. "Normalization" consists of: conversion to lower case, UNICODE normalization, stripping of leading and trailing white space, and collapsing of any remaining white space into a single space character. |

TABLE 4

Classification System Metadata
Classification System Metadata (GROUP only)
A sequence of at least 2 and at most 5 groupComponentIds

| Name | Type | Description |
|---|---|---|
| groupComponentId | String | Identifies one of the classification systems that form part of this group. It can be the UDDI v3 tModel Key that represents that Classification System. |

Moreover, in some implementations, classification service 185 may be used to read and/or write the content of the classification systems. Tables 5 and 6 depict an example structure for such reading and writing.

TABLE 3

Classification System Metadata
Classification System Metadata (HIERARCHY)

| Name | Type | Description |
|---|---|---|
| serializationMethod | Int | Determines how to "serialize" a point in the hierarchy into a single string value. 0 = SIMPLE_CODE, 1 = CONCATENATE, 2 = CONCATENATE_WITH_LEAD_SEP, 3 = CONCATENATE_NO_SEP. With serializationMethod SIMPLE_CODE, the code of a point in the hierarchy is serialized without any parent information (e.g., "dog"). With serializationMethod CONCATENATE, the point in the hierarchy is serialized with the codes of all of its ancestors, left to right, oldest ancestor to youngest. The codes are separated with a pathSeparator string (e.g., "animal/mammal/dog"). The serializationMethod CONCATENATE_WITH_LEAD_SEP is exactly like CONCATENATE with a pathSeparator string pre-pended (e.g., "/animal/mammal/dog"). With serializationMethod CONCATENTE_NO_SEP, the point in the hierarchy is serialized with the codes of all of its ancestors, left to right, oldest ancestor to youngest (e.g., "animalmammaldog") |
| pathSeparator | String | Meaningful only if serializationMethod = CONCATENATE or CONCATENATE_WITH_LEAD_SEP. This is the string (string, not character) used to separate the nodes in the hierarchy from each other. Max length of this String is 3. |

TABLE 5

Classification System Value
Classification System Value

| Name | Type | Description |
| --- | --- | --- |
| Code | String | This code, together with the path, uniquely identifies a point in the classification system. There is a length constraint for this field - no longer e.g. than 255 symbols. |
| Description | String | Description of this point in the classification system. Optional. |
| Path | String[ ] | A sequence of strings, each of which is the code of an ancestor of this point in the classification system. Order is oldest ancestors to youngest ancestor. An absent or empty path element signifies that this code has no ancestors (i.e. classification system is flat, or code is at top level of a hierarchy). Zero length strings in the sequence are permitted only in the case of a GROUP, to express classification that used only a subset of the group. There is a length constraint for this field - sum of length of all strings plus length of all pathSeparators between them must be no more than 255 symbols |
| Selectable | Boolean | If false, this point in the classification system may not be used to classify data. |

TABLE 6

Classification System Value for Groups
Group Value

| Name | Type | Description |
| --- | --- | --- |
| Id | String | A key which identifies one of the classification systems used in this group. Each id in the sequence must be different, and each id in the sequence must be in the set of IDs defined in the metadata of the group. Not every ID defined in the metadata need be present in the sequence (i.e. partial groups are supported). |
| Value | String | Values that represents a valid point in the classification system identified by the Id above. For flat classification systems, this is simply the code. For hierarchy classification systems, this is the value produced according to the classfication system's serializationMethod. |

In some implementations, classification service 185 may be called to access methods. For example, the method "getAllClassificationSystems" may be called at classification service to obtain metadata for all of the classification systems defined in classification service 185. The method "getClassificationSystem" may be called to obtain metadata for specific classification systems defined in the classification service 185. The method "getClassificationSystemValue" may be called to obtain classification value details like description, selectable, and the like. The method "getClassificationSystemValues" may be called to obtain the contents of a classification system defined in the classification service 185. The "createCassificationSystem" API may be used to create a new classification system. The "updateClassificationSystem" API may be used to modify an existing metadata of the classification system. The "saveClassificationSystemValues" API may be used to add new values or to modify existing values to a classification system of type flat or hierarchy. The "saveClassifcationSystemGroupValues" API may be used to add new values to a classification system of type group. The "deleteClassificationSystem" API may be used to delete a classification system and all of its data. The "deleteClassificationSystemAllValues" API may be used to delete all of the classification data of the classification system.

UDDI may be modeled using standard approaches, such as tModels. However, these standard tModels may be augmented to include one or more of the following: which services are available in a system (e.g., landscape); which services are modeled; which models are implemented in a system; which services are configured and thus invoked; and where should the service endpoints of the web service be exposed? To support such augmentation, additional classifications and modeling may be implemented using UDDI tModels including descriptions for category group, references to identify a group, constituent category systems, and the like.

FIGS. 4-8 depicts UDDI tModels representations consistent with the subject matter described herein. In particular, the UDDI tModel may also include aspects to enable operation in an OASIS open standard recommendation environment where WSDL is used in a UDDI registry. Moreover, the UDDI tModels of FIGS. 4-8 may include additional categorizations as well as identifiers and documentation links to the UDDI entities. Moreover, the UDDI tModel of FIGS. 4-8 may include additional UDDI entities not specified by the OASIS standard to enable use with predefined classification systems. For example, a UDDI tModel may be implemented to include category information identifying a physical system.

Figure 4:
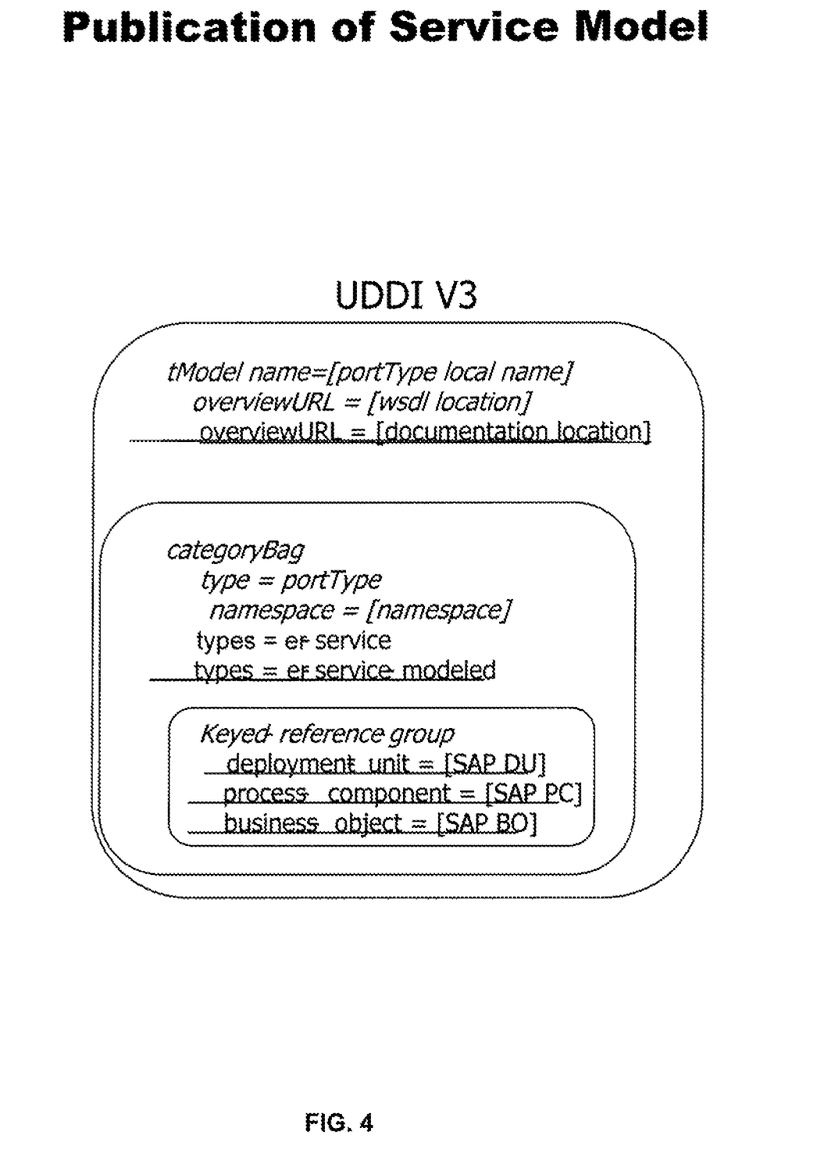
FIGS. 4-8 depict tModels.
Figure 5:
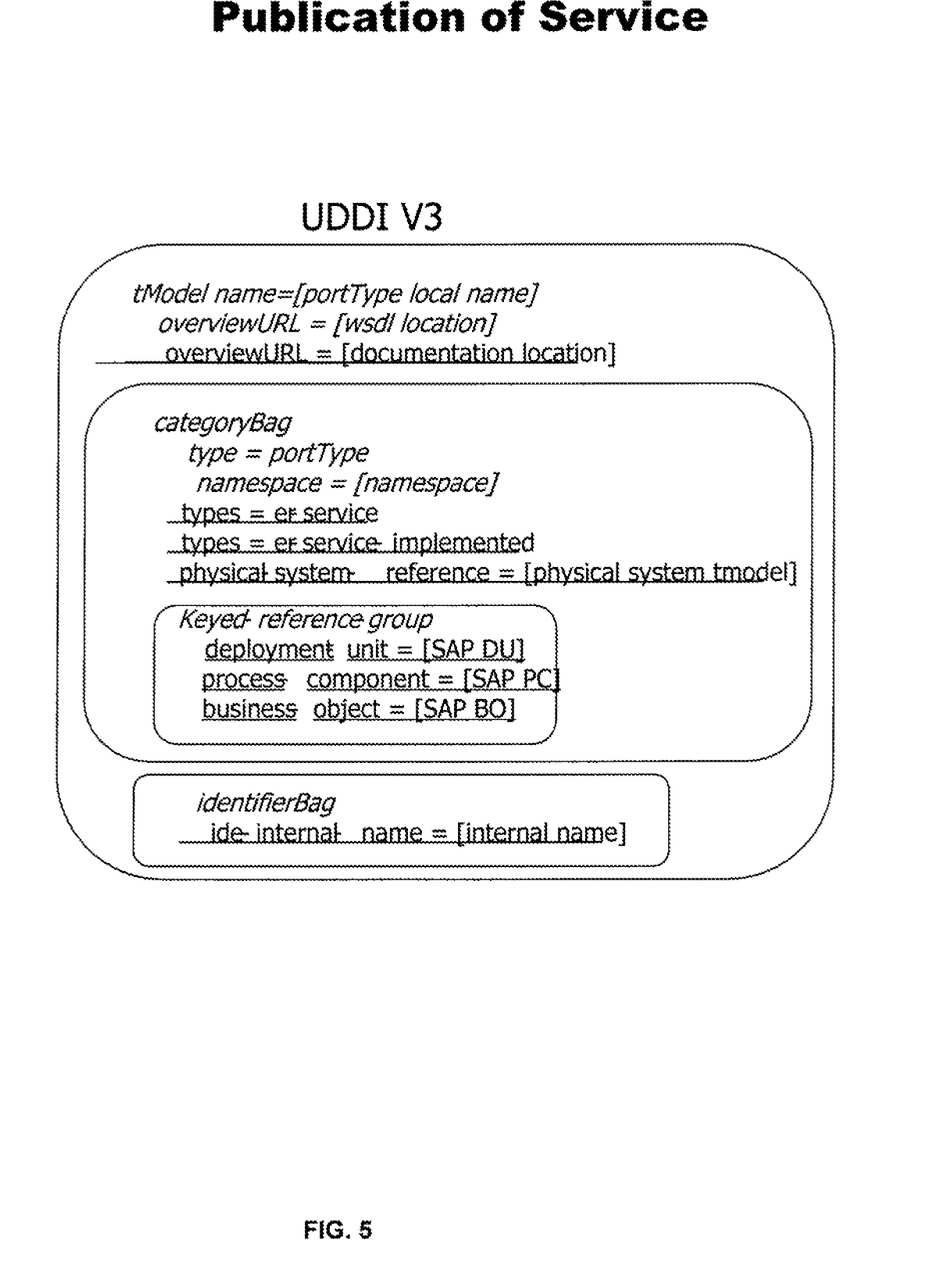
Figure 6:
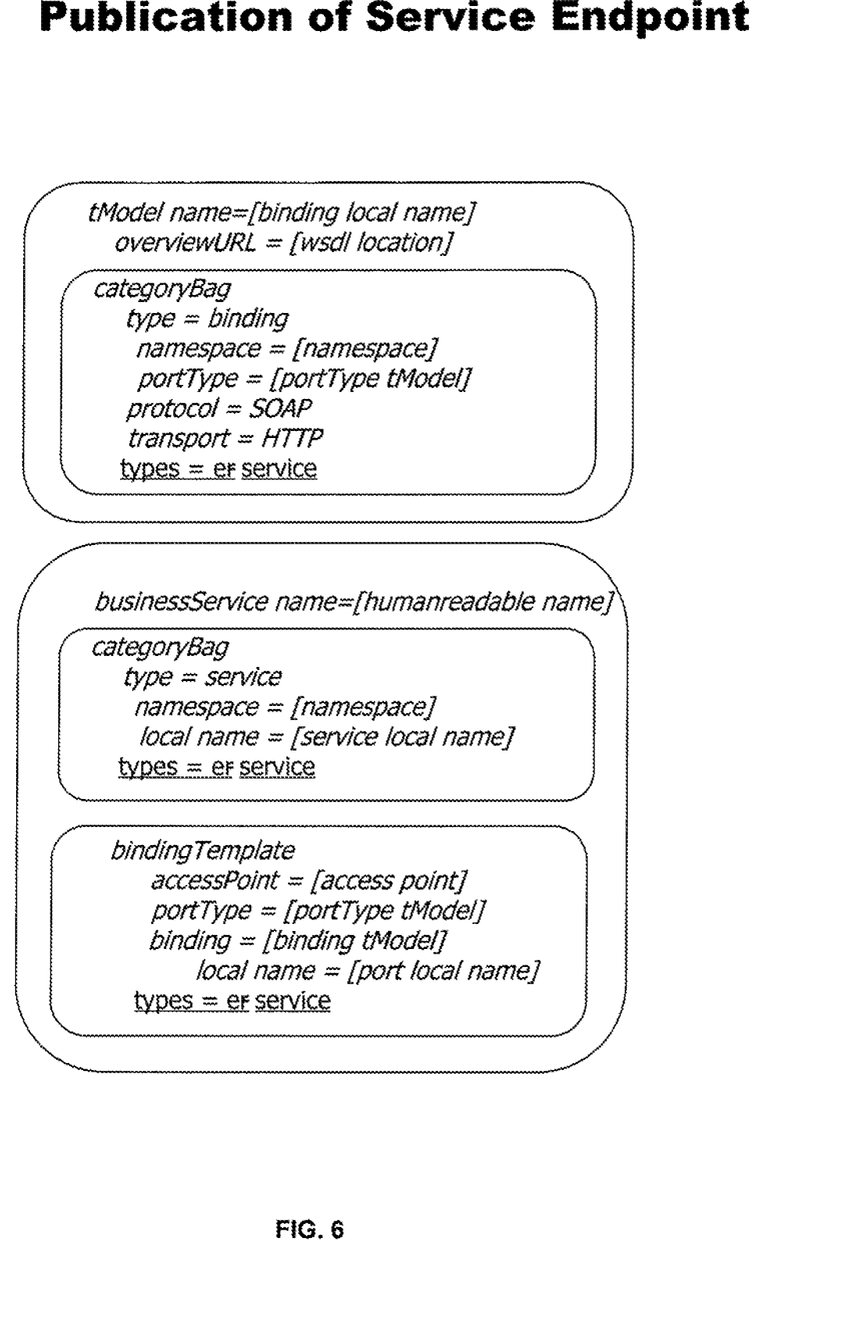
Figure 7:
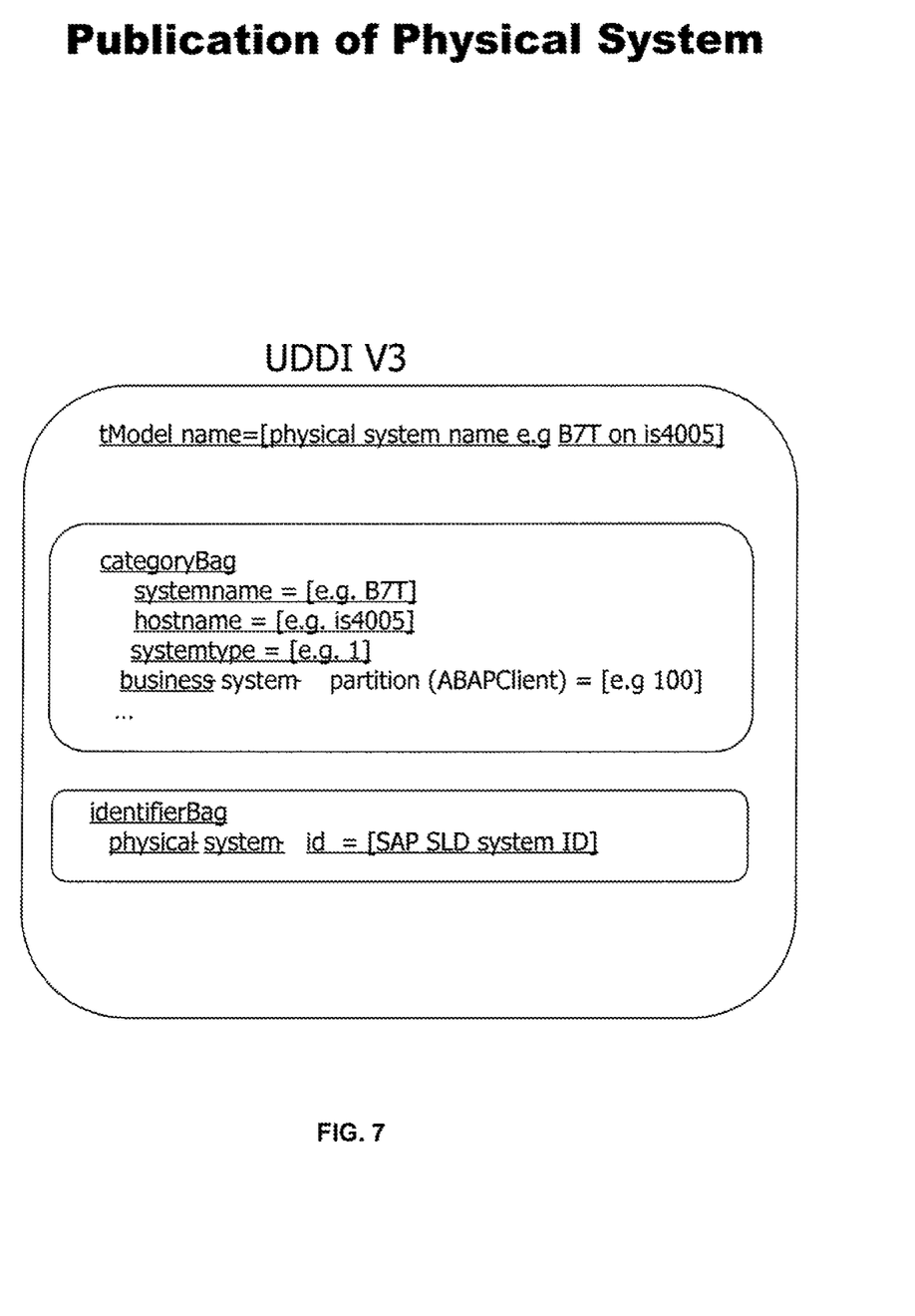
Figure 8:
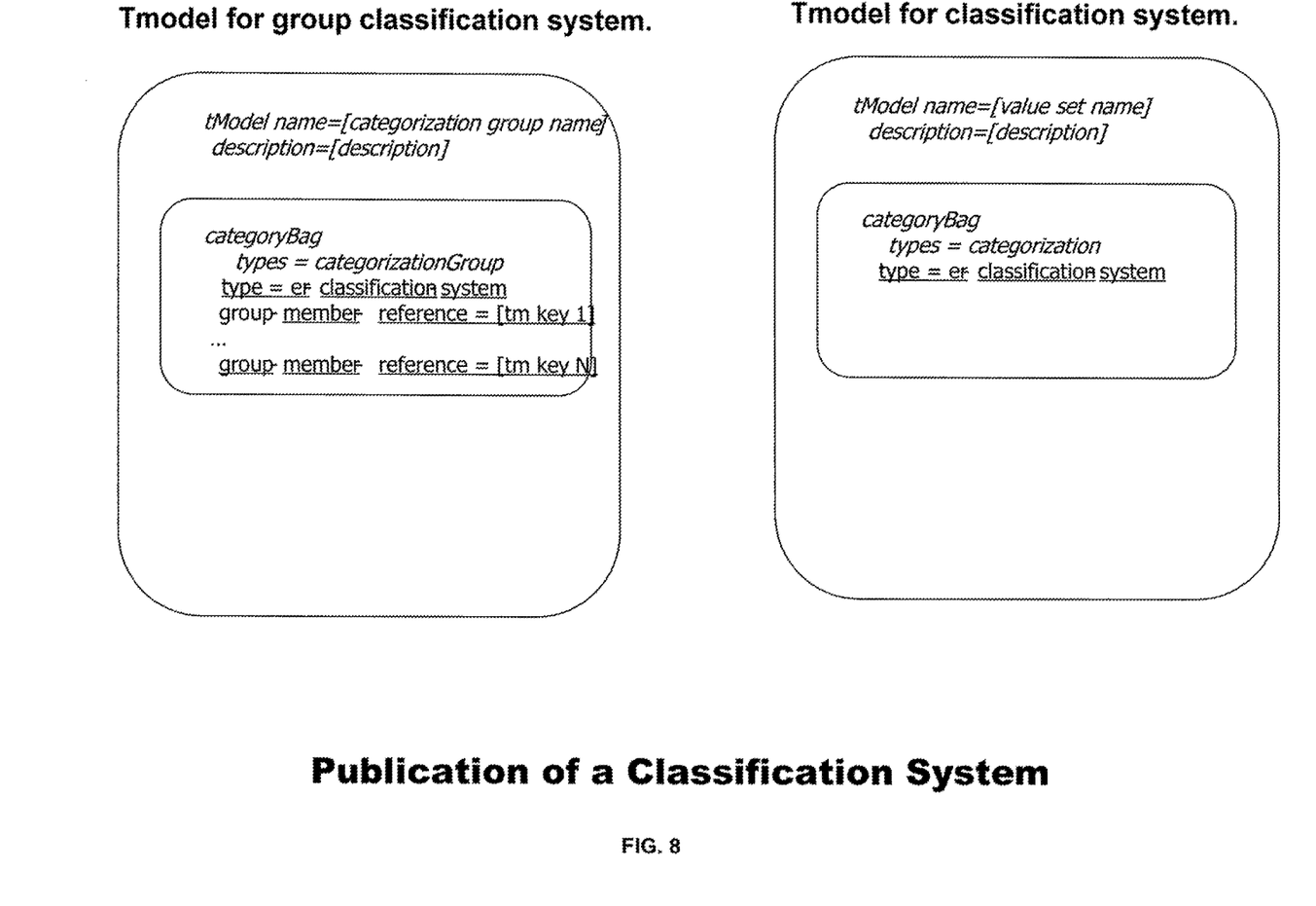

FIG. 4 depicts various aspects of the tModel including an "overviewURL" as well as a categoryBag including types for specific services (e.g., "er-service" and "er-service-modeled") and a keyed-reference group representation of a keyed-reference group for a specific physical system. Moreover, a Keyed-reference group for a deployment unit is depicted as well. FIG. 4 may be used to publish the tModel to other entities. FIG. 5 depicts the addition of a "physical-system-reference," which may be used to point to another tModel representing a physical system. For example, the physical system may represent an ABAP (Advanced Business Application Programming) implementation. The physical system information may be used to determine what services are available at a physical system. FIG. 5 also depicts the addition of an indentifierBag. FIG. 6 depicts how service end-points are modeled using the tModel (see, e.g., "types=er-service"). FIG. 7 depicts a tModel for a physical system including a tModel name, a categoryBag with system specific information, and an identifierBag. FIG. 8 depicts a tModel for a group classification including a group name and a categoryBag.

In some implementations, the subject matter described herein may enable searching the data in a UDDI registry by keyword. For example, keyword searching of UDDI registry data may be implemented using a search engine to index UDDI registry data to enable keyword searches that return UDDI entity keys. The registry data, indexed by the search engine, includes the web service's name, description, category data, and reference documentation. The registry data may include links (e.g., URIs or URLs) to external documentation, which may be indexed as well. In one implementation, data is extracted from the UDDI registry using UDDI APIs. The extracted data is then provided to a search engine (e.g., an application that searches and/or creates an index), where the extracted data is indexed for searching. Classification service 185 may include an API for keyword searches of the indexed data.

In some implementations, classification service 185 may enable the representation of UDDI registry in different business contexts of a service, so that the functionality of browsing services (e.g., at user interface 110) may be based on predefined classifications systems, as noted above. User interface 110 may use classification service 185 to provide a classification that may be browsed (e.g., presented) based on different business contexts. For example, user interface 110 may use a predetermined (e.g., predefined) classification system to classify registry data (e.g., at UDDI registry 160) based on a relevant industry "Oil&Gas" and a country "Germany," while another classification system may be predetermined relevant to the industry "Mining" and the country "Bulgaria." These different classification systems may enable different browsing schemes, so that in one case the browser presents "Oil&Gas" followed by the country "Germany" and in the other case the browser presents "Mining" followed by the country "Bulgaria," In some implementations, grouping mechanisms provided as part of UDDI registry 160 may be used to show relationships and store real combinations of classifications in classification service 185. The groupings may be developed using metadata in UDDI registry 160 and stored as a classification system for use by classification service 185 to support browsing by user interface 110. In such cases, the user interface 110 may browse and only present, for example, specific groupings of data that fall into the classification scheme defined by the classification system (e.g., only showing registry data representative of the "Oil Industry" and "Bulgaria" combination).

The classification service 185 may be implemented as a program or component, i.e., a small binary object (e.g., an applet) or program that performs a specific function and is designed in such a way to operate easily with other components and applications, such as a service, Web service, and/or user interface 110. In some implementations, classification service 185 is implemented as a service (e.g., as part of SAP's Enterprise Services Framework) or a web service accessible by other applications through an intranet and/or the Internet.

Figure 9:
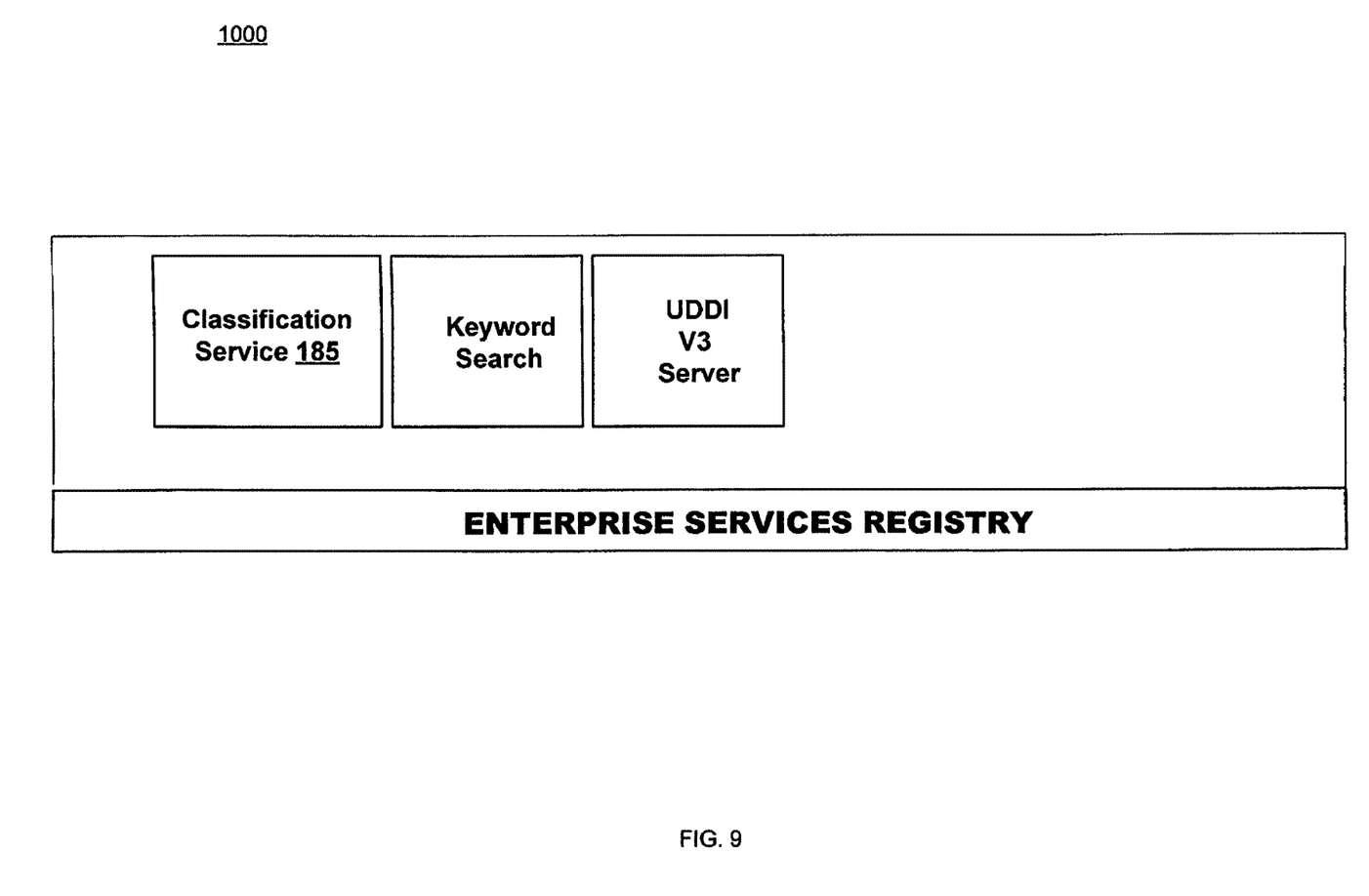
FIG. 9 depicts an example of an implementation of the classification service.

FIG. 9 depicts an example implementation of classification service 185 in an enterprise services registry 1000. Specifically, the classification service 185 may be implemented as part of an Enterprise Services Registry, which may also include other aspects such as a UDDI V3 server, and a keyword search service.

Figure 10:
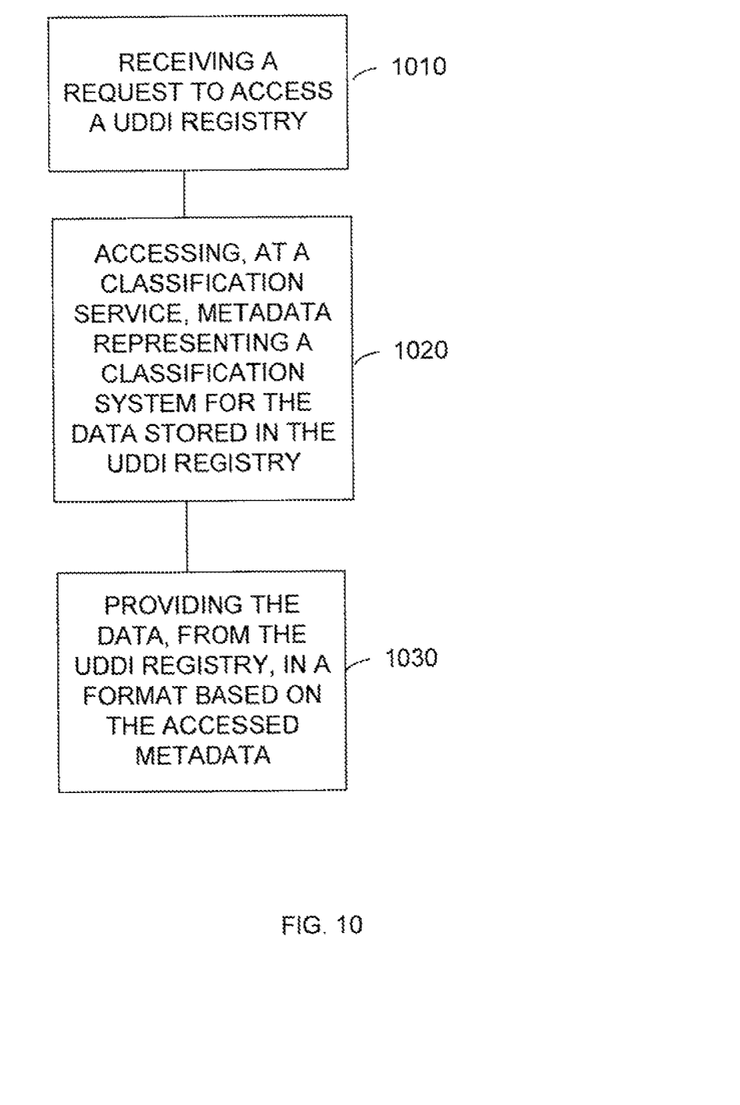
FIG. 10 depicts a process for classifying UDDI registry data.

FIG. 10 depicts a process for a classification service. At 1005, classification service 185 receives a request to access a UDDI registry from user interface 110. The request may be implemented as a message, such as a SOAP message. At 1010, classification service 185 may access metadata representing a classification system. The accessed metadata (e.g., Tables 1-4 above) enables classification service 185 to provide registry data from registry 160 in accordance with a predetermined classification system (e.g., a group, a hierarchy, or a flat format). At 1020, the registry data is provided by the classification system 185 to user interface 100 in a format consistent with the predetermined classification system.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A computer-readable storage medium containing instructions to configure a processor to perform a method, the method comprising:

forming, at a classification service, a plurality of predetermined classification systems for data in a universal, description, discovery and integration registry;

managing, at the classification service, metadata representing the plurality of predetermined classification systems;

accessing, at the classification service in response to a request received from a user interface, the metadata representing the plurality of predetermined classification systems formed for the data stored in the universal, description, discovery and integration registry;

accessing, by the classification service, the data stored in the universal, description, discovery and integration registry, wherein the data is accessed based on the accessed metadata; and providing, by the classification service, to the user interface the data from the universal, description, discovery and integration registry in a format based on at least one of the plurality of predetermined classification systems represented by the accessed metadata.

2. The computer-readable storage medium of claim 1, wherein accessing further comprises:

accessing metadata describing data in the universal, description, discovery and integration registry, the metadata enabling the data in the universal, description, discovery and integration registry to be grouped separate from the universal, description, discovery and integration registry.

3. The computer-readable storage medium of claim 2, wherein accessing further comprises:

grouping, based on the accessed metadata, to form a group format.

4. The computer-readable storage medium of claim 3, wherein grouping further comprises:

grouping the data in the universal, description, discovery and integration registry to enable the data in the universal, description, discovery and integration registry to be presented based on the grouping.

5. The computer-readable storage medium of claim 3, wherein grouping further comprises:

grouping the data in the universal, description, discovery and integration registry to generate an index for searching.

6. The computer-readable storage medium of claim 1, wherein the method further comprises:

implementing a tModel to describe a physical system implementing the plurality of predetermined classification systems including the metadata.

7. The computer-readable storage medium of claim 1, wherein the method further comprises:

providing, at the classification service, an application-programming interface to access the metadata.

8. The computer-readable storage medium of claim 1, wherein the metadata specifies the plurality of predetermined classification systems formed for the data.

9. A computer-implemented method comprising:

forming, at a classification service, a plurality of predetermined classification systems for data in a universal, description, discovery and integration registry;

managing, at the classification service, metadata representing the plurality of predetermined classification systems;

accessing, at the classification service in response to a request received from a user interface, the metadata representing the plurality of predetermined classification systems formed for the data stored in the universal, description, discovery and integration registry;

accessing, by the classification service, the data stored in the universal, description, discovery and integration registry, wherein the data is accessed based on the accessed metadata; and providing, by the classification service, to the user interface the data from the universal, description, discovery and integration registry in a format based on at least one of the plurality of predetermined classification systems represented by the accessed metadata.

10. The computer-implemented method of claim 9, wherein accessing further comprises:

accessing metadata describing data in the universal, description, discovery and integration registry, the data enabling the data in the universal, description, discovery and integration registry to be grouped separate from the universal, description, discovery and integration registry.

11. The computer-implemented method of claim 10, wherein accessing further comprises:

grouping, based on the accessed metadata, to form a group format.

12. The computer-implemented method of claim 11, wherein grouping further comprises:

grouping the data in the universal, description, discovery and integration registry to enable the data in the universal, description, discovery and integration registry to be presented based on the grouping.

13. The computer-implemented method of claim 11, wherein grouping further comprises:

grouping the data in the universal, description, discovery and integration registry to generate an index for searching.

14. The computer-implemented method of claim 9 further comprising:

implementing a tModel to describe a physical system implementing the plurality of predetermined classification systems including the metadata.

15. The computer-implemented method of claim 9 further comprising:

providing, at the classification service, an application-programming interface to access the metadata.

16. A system comprising:

a processor; and a memory, wherein the processor and the memory are configured to perform a method comprising:

forming, at a classification service, a plurality of predetermined classification systems for data in a universal, description, discovery and integration registry;

managing, at the classification service, metadata representing the plurality of predetermined classification systems;

accessing, at the classification service in response to a request received from a user interface, the metadata representing the plurality of predetermined classification systems formed for the data stored in the universal, description, discovery and integration registry;

accessing, by the classification service, the data stored in the universal, description, discovery and integration registry, wherein the data is accessed based on the accessed metadata; and providing, by the classification service, to the user interface the data from the universal, description, discovery and integration registry in a format based on at least one of the plurality of predetermined classification systems represented by the accessed metadata.

17. The system of claim 16, wherein accessing further comprises:

accessing metadata describing data in the universal, description, discovery and integration registry, the data enabling the data in the universal, description, discovery and integration registry to be grouped separate from the universal, description, discovery and integration registry.

18. The system of claim 17, wherein accessing further comprises:
   grouping, based on the accessed metadata, to form a group format.

19. The system of claim 18, wherein grouping further comprises:
   grouping the data in the universal, description, discovery and integration registry to enable the data in the universal, description, discovery and integration registry to be presented based on the grouping.

20. The system of claim 18, wherein grouping further comprises:
   grouping the data in the universal, description, discovery and integration registry to generate an index for searching.

21. The system of claim 16 further comprising:
   implementing a tModel to describe a physical system implementing the plurality of predetermined classification systems including the metadata.

* * * * *